United States Patent
Guillemaud et al.

(10) Patent No.: US 8,670,601 B2
(45) Date of Patent: Mar. 11, 2014

(54) MULTIPLANE RECONSTRUCTION TOMOSYNTHESIS METHOD

(75) Inventors: Régis Guillemaud, La Trouchu (FR); Pierre Bleuet, Tom du Pun (FR); Isabelle Magnin, Lyons (FR)

(73) Assignees: Commissariat a l'Energie Atomique, Paris (FR); Centre National de la Recherche Scientifique, Paris (FR)

( * ) Notice: Subject to any disclaimer, the term of this patent is extended or adjusted under 35 U.S.C. 154(b) by 2115 days.

(21) Appl. No.: 10/504,260

(22) PCT Filed: Feb. 6, 2003

(86) PCT No.: PCT/FR03/00374
§ 371 (c)(1),
(2), (4) Date: Aug. 9, 2004

(87) PCT Pub. No.: WO03/067525
PCT Pub. Date: Aug. 14, 2003

(65) Prior Publication Data
US 2005/0078862 A1     Apr. 14, 2005

(30) Foreign Application Priority Data

Feb. 8, 2002 (FR) .................................... 02 01558

(51) Int. Cl.
*G06K 9/00* (2006.01)

(52) U.S. Cl.
USPC ............. 382/128; 378/197; 378/205; 378/98; 378/9; 378/11

(58) Field of Classification Search
USPC ............ 378/197, 205, 98.9, 11; 382/132, 128
See application file for complete search history.

(56) References Cited

U.S. PATENT DOCUMENTS

| 5,214,686 | A | * | 5/1993 | Webber | 378/38 |
| 5,764,719 | A | * | 6/1998 | Noettling | 378/4 |
| 5,848,114 | A | * | 12/1998 | Kawai et al. | 378/4 |
| 5,930,384 | A | | 7/1999 | Guillemaud et al. | |
| 6,196,715 | B1 | * | 3/2001 | Nambu et al. | 378/197 |

OTHER PUBLICATIONS

Charbonnier, Pierre et al., "Deterministic Edge-Preserving Regularization in Computed Imaging", IEEE Transactions on Image Processing, vol. 6, No. 2, pp. 298-311, Feb. 1997.
Demirkaya, Omer, "Reduction of Noise and Image Artifacts in Computed Tomography by Nonlinear Filtration of the Projection Images", Proceedings of SPIE vol. 4322, pp. 917-923, Medical Imaging 2001: Image Processing, 2001.
Gerig, Guido et al., "Nonlinear Anisotropic Filtering of MRI Data", IEEE Transactions on Medical Imaging, vol. 11, No. 2, pp. 221-232, Jun. 1992.
Grant, David G., "Tomosynthesis: A Three-Dimensional Radiographic Imaging Technique", IEEE Transactions on Biomedical Engineering, vol. 19, No. 1, pp. 20-28, Jan. 1972.
Smith, Bruce D., "Fan-Beam Reconstruction from a Straight Line of Source Points", IEEE Transactions on Medical Imaging, vol. 12, No. 1, pp. 10-18, Mar. 1993.

* cited by examiner

*Primary Examiner* — Manav Seth
(74) *Attorney, Agent, or Firm* — Nixon Peabody LLP

(57) ABSTRACT

The invention relates to a tomosynthesis method by illuminating an object by means of an X-ray source (1) with a linear trajectory (2), the method comprising breaking down a volume of the object into N fanned out planes (P) formed between the linear trajectory (2) and a detecting plane (4) parallel to the linear trajectory, each fanned out plane of said N planes includes the linear trajectory; and performing anisotropic regularization on at least one fanned out plane (P).

5 Claims, 2 Drawing Sheets

US 8,670,601 B2

MULTIPLANE RECONSTRUCTION TOMOSYNTHESIS METHOD

CROSS-REFERENCE TO RELATED APPLICATION

This application claims priority based on International Patent Application No. PCT/FR03/00374, entitled "Multiplane Reconstruction Tomosynthesis Method" by Regis Guillemaud, Pierre Bleuet and Isabelle Magnin, which claims priority of French application no. 02 01558, filed on Feb. 8, 2002, and which was not published in English."

TECHNICAL FIELD AND PRIOR ART

The invention relates to a tomosynthesis method with illumination of an object by means of an X-ray source.

The invention finds application in the field of medical imaging, the field of non-destructive object testing and, more generally in any field applying reconstruction of objects moving past an X-ray source.

Tomosynthesis is a technique which enables, from a small number of 2D projections (2D for two-dimensional) distributed over a limited angular range and acquired on a digital sensor, the 3D volume (3D for three dimensions) of a studied object to be reconstructed.

As the number of 2D projections and the angular displacement are limited, the use of reconstruction methods associated with an regularization operation is needed in order to obtain good resolution for the reconstructions.

A system for applying the tomosynthesis method according to the known art is illustrated symbolically in FIG. 1. An X-ray source 1 moves along a linear trajectory 2 and past an object 3. The X-rays 5 which pass through the object 3 are detected by a mobile detector 4 which moves in an opposite direction 6 to the direction of the source 1. A computer system (not illustrated in the figure) collects information from the mobile detector for acquiring, processing and reconstructing the 3D image of the object.

Several 2D projections of the object to be studied are acquired for different viewing angles. From these projections, the algorithm used in tomosynthesis either proceeds analytically by retroprojection of each of the 2D projections (cf. "*Tomosynthesis: A 3D radiographic imaging technique*", D. G. Grant, IEEE TMBE, vol. 19, pp 20-28, 1972), or algebraically, possibly with regularization (cf. "*Deterministic Edge Preserving Regularization in Computed Imaging*", P. Charbonnier, IEEE TIP, vol. 16, February 1997).

If the algorithm proceeds analytically, 3D reconstruction is relatively fast but provides relatively blurred reconstructions because of the small number of projections and of the limited angle character of the 2D projections.

By using an algebraically proceeding algorithm with regularization, higher quality reconstructions with a higher resolution may be obtained. Algorithms which proceed algebraically with regularization, apply methods based on an iterative process between projection and reconstruction, in which it is possible to introduce a priori known information on the object. The underlying hypothesis of these methods is that of an object to be studied, formed of homogeneous areas separated by sharp edges. Noise may thereby be smoothed out, while preserving the discontinuities present in the object.

Regularization may be anisotropic and adapted to the object itself as disclosed in U.S. Pat. No. 5,930,384, entitled "Process for the reconstruction of a 3D image with contrast and resolution improvements and application of said process to the production of attenuation cartography of an object".

This patent describes the taking into account of an object model which enables the blood vessels to be intensified in their transverse direction and to be smoothed out along their longitudinal direction. The processing carried out is not based on any hypothesis concerning the acquisition geometry or the sampling type of the reconstruction volume but on hypotheses specific to the object.

The article "*Fan-Beam reconstruction from a straight line of source points*" (B. D. Smith, IEEE TMI, vol. 12, No. 1, 1993) discloses for reconstructing the 3D volume, the utilization of the linear trajectory of the source in a special geometry formed by a series of planes P fanned out as illustrated in FIGS. 2A and 2B. A detecting plane 4 comprises several detecting pixel parallel lines 7. By fanning out the planes P, it should be understood that each plane passes through the trajectory 2 of the source and a line 7 of detecting pixels. Each plane P is independent of the other planes. Such a geometry is only applicable in the case of a linear trajectory of the source. In this article, the reconstruction is of the analytical type. The possibility of reconstructing the 3D volume is theoretically investigated with an infinite linear trajectory.

An accurate reconstruction formula is given under these conditions. By passing to a finite linear trajectory of the source, the quality of the reconstructions proves to be very insufficient and post-reconstruction processing is then required.

Generally, according to the known art, in linear tomosynthesis, one is in the presence of a problem of vertical deformation of the objects along the vertical axis z which is also expressed by blurring in the translation direction of the source. Moreover, each of these directions (x,y,z) is submitted to acquisition noise.

The method according to the invention does not have these drawbacks.

DISCLOSURE OF THE INVENTION

Indeed, the invention relates to a tomosynthesis method with illumination of an object by means of an X-ray source having a linear trajectory, the method comprising a step for breaking down the volume of the object into n fanned out independent planes. The method comprises an anisotropic regularization step on each plane.

According to an enhanced embodiment of the invention, the tomosynthesis method comprises an additional regularization step among planes.

The tomosynthesis method according to the invention has the advantage of being adapted to the linear trajectory of the source. This is an algebraic processing method, particularly well adapted to 3D reconstruction with few data.

SHORT DESCRIPTION OF THE FIGURES

Other features and advantages of the invention will become apparent upon reading a preferential embodiment of the invention with reference to the appended figures wherein.

DETAILED DESCRIPTION OF THE EMBODIMENTS OF THE INVENTION

Figure 3:
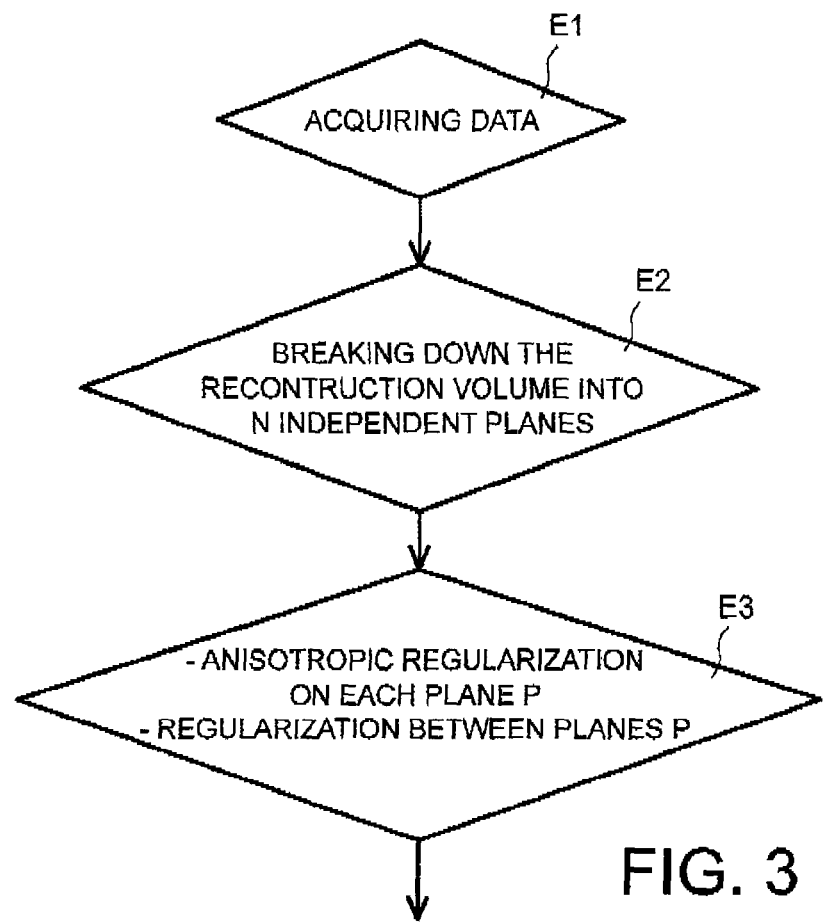
FIG. 3 illustrates a tomosynthesis method algorithm according to the invention.

As illustrated in FIG. 3, the method according to the invention successively comprises a step E1 for acquiring data, a step E2 for breaking down the reconstruction volume into independent planes, and a step E3 for reconstruction and regularization.

Figure 1:
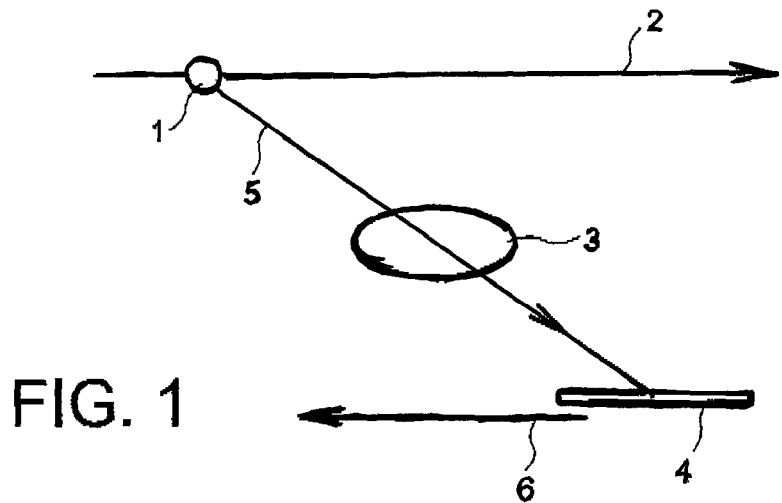
FIG. 1 illustrates a block diagram of the system for applying the tomosynthesis method.

Step E1 is a step known per se, during which an X-ray source and a planar detector move linearly, parallel to each other, in opposite directions, as described earlier (cf. FIG. 1). The planar detector is formed of a set of lines of detecting pixels. With reference to FIG. 1, space being referenced by the direct three axis reference system (x,y,z), the trajectory of the source extending along the x direction and the detecting plane is parallel to the (x,y) plane.

Figure 2A:
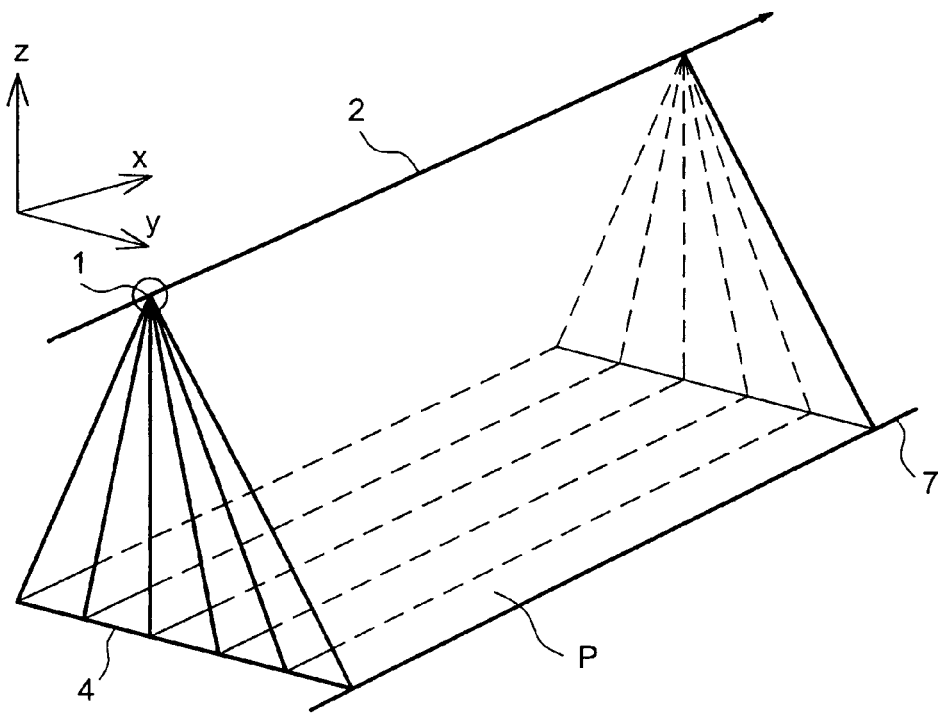
FIGS. 2A and 2B illustrate fanned out 2D planes for a regularization in which the X-ray source moves along a linear trajectory.
Figure 2B:
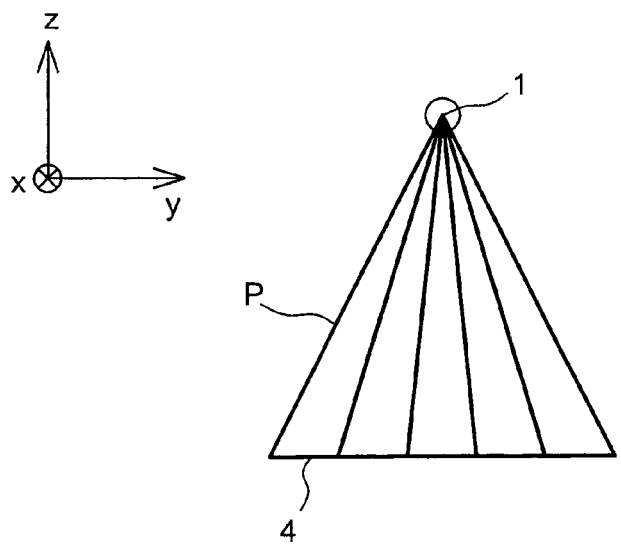

Step E2 performs from data acquired during step E1, a breakdown of the volume of the object into n planes P which are fanned out. The n P planes are independent of each other. Plane P passes through the trajectory of the source and through a line of pixels of the detector (cf. FIG. 2A).

As soon as the breaking down into planes has been carried out, the method according to the invention applies step E3 for reconstructing the 3D volume. The reconstruction step is associated with an anisotropic regularization step adapted to the data acquisition geometry, i.e. to the linear trajectory of the source. With the anisotropic regularization according to the invention, it is advantageously possible to smooth out certain structures and enhance others. The term "enhance" should be understood as the action of emphasizing or accentuating the contrast of a structure.

Three types of artifacts are present during the reconstruction: noise, limited angle artifacts and the blurring from the movement of the source. These phenomena are distributed in the three spatial directions as follows:
1. Along the x direction, there is noise and blurring due to the displacement of the source.
2. Along the y direction, there is only noise (resolution is then only that of the detector).
3. Along the z direction, there is noise and limited angle artifacts because of the finite trajectory of the source.

With the anisotropic regularization algorithm according to the invention, it is advantageously possible to process each of the x, y, z directions differently.

By reconstructing with fanned out P planes, computing time may be reduced, considerably, as the processing operations are performed in two dimensions, and it is possible to carry out the processing of the different planes in parallel.

The anisotropic regularization on a P plane is carried out independently of the regularization of the other planes. This anisotropic regularization performed in two dimensions consists of a processing operation of the smoothing type along the x direction and a smoothing operation of the enhancement type along an axis which is the projection of the z axis on plane P.

According to an enhanced embodiment of the invention, regularization on each P plane may be followed by a regularization of the smoothing type between planes along the y direction.

The regularization according to the invention is thereby adapted to the anisotropy of the reconstruction artifacts related to a particular acquisition geometry which is the linear and finite trajectory of the source. Indeed, it is along the z and x directions that the reconstructed volume has the lower resolution. The anisotropic regularization applied along these directions is able to advantageously enhance the quality of the reconstructed images, very substantially. On the other hand, it is along the y direction that the acquired data have the best resolution. As a result, a smoothing operation is sufficient along the y direction to improve the quality of the reconstructed images.

The algebraic regularization algorithm according to the invention applies the minimization of a function J(f), where variable f represents the object to be reconstructed. As a non-limiting example, function J(f) may be written as:

$$J(f) = \|p - Rf\|^2 + \lambda_x^2 \sum_{i,j,k} \varphi_x\left(\frac{f_{i,j,k} - f_{i-1,j,k}}{\delta_x}\right) + \quad \text{(equation (1))}$$

$$\lambda_y^2 \sum_{i,j,k} \varphi_y\left(\frac{f_{i,j,k} - f_{i-1,j,k}}{\delta_y}\right) + \lambda_z^2 \sum_{i,j,k} \varphi_z\left(\frac{f_{i,j,k} - f_{i-1,j,k}}{\delta_z}\right)$$

wherein
 $f_{i,j,k}$ represents the reconstructive object at coordinate points i, j, k,
 R is a projection matrix applied to the object,
 p is a projection, i.e. the Napierian logarithm of the ratio between the acquired information by the detector in the absence of the object and the information acquired by the detector in presence of the object,
 $\phi_x$, $\phi_y$, $\phi_z$ are functions commonly called potential functions, which determine along the respective directions x, y, z, to which extent it was decided whether a contour of the object to be reconstructed was detected,
 $\lambda_x$, $\lambda_y$, $\lambda_z$ are weighting factors which estimate, along the respective directions x, y, z, the difference between the projections and the a priori evaluated data (data relative to the objects to be reconstructed, considered to be formed with homogeneous areas separated by sharp edges).
 $\delta_x$, $\delta_y$, $\delta_z$ are minimum gray level heights of the image along the respective directions x, y, z, for which a contour is accepted ($\delta_x$, $\delta_y$ and $\delta_z$ are therefore selected to be larger than a noise level).

In equation (1), the term SV #176215 v1$^2$ is a reconstruction term computed from acquired raw data. The three other terms of the equation are computed reconstruction terms which may be processed independently of each other by changing the quantities $\delta_x$, $\delta_y$, $\delta_z$, $\lambda_x$, $\lambda_y$, $\lambda_z$, $\phi_x$, $\phi_y$, $\phi_z$.

Advantageously, according to the invention, it is the acquisition geometry, i.e. the finite linear trajectory of the source which determines the type of regularization and not the object as it was the case according to the known art.

The adaptation of the anisotropic regularization to the linear trajectory of the source will now be described more specifically with reference to the aforementioned quantities $\delta_x$, $\delta_y$, $\delta_z$, $\lambda_x$, $\lambda_y$, $\lambda_z$, $\phi_x$, $\phi_y$, $\phi_z$.

Parameter $\lambda_z$ is selected to be larger than $\lambda_x$ and $\lambda_y$, so as to more pronouncedly regularize along the z direction where the artifacts are pronounced, because of the linear trajectory of the source. Parameter $\delta_z$ is selected to be smaller than $\delta_x$ and $\delta_y$, in order to more pronouncedly take into account the discontinuities in the z direction than in the x and y directions. Parameters $\lambda_y$ and $\delta_y$ are selected to be small because the resolution along the y direction is a good quality resolution a priori.

Finally, the $\phi_z$ function is preferentially selected to be concave in order to enhance the reconstructed volume more pronouncedly along the z direction, whereas functions $\phi_x$ and $\phi_y$ are preferentially selected to be convex.

According to a second embodiment of the invention, two perpendicular linear trajectories are used for the source. The reconstruction is then performed on the basis of a square-based pyramid corresponding to the intersection of two sets of perpendicular fanned out planes. The advantage of using two perpendicular trajectories is to give more information on the object and from this, to better reconstruct the latter.

Whichever the embodiment of the invention, the method may also further comprise processing and correcting the radiation scattered by the object in order to further increase the resolution of the reconstructed image.

According to the preferential embodiment of the invention described above, the lines 7 of detecting pixels are substantially parallel to the trajectory of the source. If parallelism between the trajectory of the source and the detecting pixel lines is not properly achieved, for example for mechanical reasons, one proceeds with the re-sampling step of the projections before the reconstruction step. The re-sampling step may be achieved by interpolation.

The invention claimed is:

1. A tomosynthesis method by illuminating an object by means of an x-ray source with a linear trajectory, the method comprising:
   moving the x-ray source and a planar detector having a set of lines of detecting pixels linearly in opposite directions along an x axis, the object being placed between the x-ray source and the planar detector, the planar detector being parallel to a plane (x, y), wherein a space is referenced by a three axis reference system (x, y, z),
   acquiring and processing information from the planar detector by means of a computer, the processing of said information comprising:
   formulating a reconstruction volume of the object into the form of N fanned out planes (P) formed between the linear trajectory of the source and a detecting plane parallel to the linear trajectory of the source, each fanned out plane of said N planes including the linear trajectory of the source; and
   performing anisotropic regularization on at least one fanned out plane (P).

2. The method according to claim 1, wherein the anisotropic regularization step performed in two dimensions on a plane (P) consists of a smoothing operation along the (x) axis of the linear trajectory of the source and of an enhancing operation along an axis which is a projection of the z axis on the plane (P).

3. The method according to claim 2, characterized in that it comprises a further smoothing step between planes (P) along the y axis.

4. A tomosynthesis method by illuminating an object by means of an x-ray source with a linear trajectory, the method comprising:
   breaking down a volume of the object into N fanned out planes (P) formed between the linear trajectory and a detecting plane parallel to the linear trajectory, each fanned out plane of said N planes includes the linear trajectory; and
   performing anisotropic regularization on at least one fanned out plane (P),
   wherein the anisotropic regularization comprises the minimization of a function J(f) such that:

$$J(f) = \|p - Rf\|^2 + \lambda_x^2 \sum_{i,j,k} \varphi_x\left(\frac{f_{i,j,k} - f_{i-1,j,k}}{\delta_x}\right) + \lambda_y^2 \sum_{i,j,k} \varphi_y\left(\frac{f_{i,j,k} - f_{i-1,j,k}}{\delta_y}\right) + \lambda_z^2 \sum_{i,j,k} \varphi_z\left(\frac{f_{i,j,k} - f_{i-1,j,k}}{\delta_z}\right)$$

wherein
$f_{i,j,k}$ represents the reconstructive object at coordinate points i, j, k,
R is a projection matrix applied to the object,
p is a projection,
$\varphi_x$, $\varphi_y$, $\varphi_z$ are functions which determine along the respective directions x, y, z, to which extent it was decided whether a contour of the object to be reconstructed was detected, the x direction being the direction of the linear trajectory of the source and the y and z directions being mutually perpendicular to each other, which define a plane perpendicular to the detecting plane,
$\lambda_x$, $\lambda_y$, $\lambda_z$ are weighting factors which estimate, along the respective directions x, y, z, the difference between the projections and the a priori evaluated data,
$\delta_x$, $\delta_y$, $\delta_z$ are minimum heights of the image along the respective directions x, y, z, for which a contour is accepted.

5. The method according to claim 1, wherein the anisotropic regularization comprises a smoothing operation along the x axis of the linear trajectory of the source and of an enhancing operation along an axis which is a projection of the z axis on the plane, said anisotropic regularization comprising the minimization of a function J(f) such that:

$$J(f) = \|p - Rf\|^2 + \lambda_x^2 \sum_{i,j,k} \varphi_x\left(\frac{f_{i,j,k} - f_{i-1,j,k}}{\delta_x}\right) + \lambda_y^2 \sum_{i,j,k} \varphi_y\left(\frac{f_{i,j,k} - f_{i-1,j,k}}{\delta_y}\right) + \lambda_z^2 \sum_{i,j,k} \varphi_z\left(\frac{f_{i,j,k} - f_{i-1,j,k}}{\delta_z}\right)$$

wherein
$f_{i,j,k}$ represents the reconstructive object at coordinate points i, j, k,
R is a projection matrix applied to the object,
p is a projection,
$\varphi_x$, $\varphi_y$, $\varphi_z$ are functions which determine along the respective directions x, y, z, the extent of the contour of the detected object to be reconstructed, the x direction being the direction of the linear trajectory of the source and the y and z directions being mutually perpendicular to each other, which define a plane perpendicular to the detecting plane,
$\lambda_x$, $\lambda_y$, $\lambda_z$ are weighting factors which estimate, along the respective directions x, y, z, the difference between the projections and the a priori evaluated data,
$\delta_x$, $\delta_y$, $\delta_z$ are minimum heights of the image along the respective directions x, y, z, for which a contour is accepted.

* * * * *

UNITED STATES PATENT AND TRADEMARK OFFICE
CERTIFICATE OF CORRECTION

PATENT NO. : 8,670,601 B2  Page 1 of 1
APPLICATION NO. : 10/504260
DATED : March 11, 2014
INVENTOR(S) : Guillemaud et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1986 days.

Signed and Sealed this

Twenty-ninth Day of September, 2015

Michelle K. Lee
*Director of the United States Patent and Trademark Office*